(12) United States Patent
Higuma

(10) Patent No.: US 6,798,989 B2
(45) Date of Patent: Sep. 28, 2004

(54) MOTOR CONTROL APPARATUS, LENS APPARATUS, CAMERA SYSTEM AND CAMERA

(75) Inventor: Kazuya Higuma, Tokyo (JP)

(73) Assignee: Canon Kabushiki Kaisha (JP)

(*) Notice: Subject to any disclaimer, the term of this patent is extended or adjusted under 35 U.S.C. 154(b) by 0 days.

(21) Appl. No.: 10/649,854

(22) Filed: Aug. 26, 2003

(65) Prior Publication Data

US 2004/0036796 A1 Feb. 26, 2004

(30) Foreign Application Priority Data

Aug. 26, 2002 (JP) .......................................... 2002-246003

(51) Int. Cl.$^7$ .............................. G03B 13/36; H02P 5/00
(52) U.S. Cl. ........................ 396/135; 348/357; 318/270
(58) Field of Search ................. 396/133, 135, 396/136; 348/202, 357; 318/270, 568.18

(56) References Cited

U.S. PATENT DOCUMENTS

| | | | | |
|---|---|---|---|---|
| 4,878,077 A | * | 10/1989 | Maeno et al. | ................ 396/135 |
| 5,249,118 A | * | 9/1993 | Smith | .......................... 700/63 |
| 6,301,441 B1 | * | 10/2001 | Kato | .......................... 396/131 |

* cited by examiner

*Primary Examiner*—W. B. Perkey
(74) *Attorney, Agent, or Firm*—Morgan & Finnegan, LLP

(57) ABSTRACT

A motor control apparatus capable of accelerating the motor speed to a target speed and stabilizing the motor speed in a short time is disclosed. The motor control apparatus includes a speed detection unit which outputs a signal according to the speed of the motor (or movable unit which uses the motor as a drive source). It also includes a control unit which applies, during the acceleration control of the motor to a target speed, an electric brake to the motor when the speed detected based on the signal from the speed detection unit exceeds the target speed.

12 Claims, 11 Drawing Sheets

MOTOR CONTROL APPARATUS, LENS APPARATUS, CAMERA SYSTEM AND CAMERA

BACKGROUND OF THE INVENTION

1. Field of the Invention

The present invention relates to an apparatus which controls a motor used to drive a lens, for example.

2. Description of the Related Art

A technology of driving a lens for autofocusing of a camera by a motor, for example is conventionally known. Autofocusing requires the lens to be driven up to a target position rapidly and accurately, and there are various proposals therefor.

For example, Japanese Patent No. 2807728 specification discloses a technology of stopping a lens using a reversing brake or short brake according to the speed to stop the lens rapidly.

The short brake is a method of quickly reducing the speed of a motor by short-circuiting between the +terminal and −terminal of the motor and utilizing electric power generation action (counter electromotive voltage) of the motor. The reversing brake is a method of quickly reducing the speed of a motor by forcing a current to flow in the reverse revolution direction between the terminals of the motor.

Stopping the motor rapidly using such a technology can shorten the time of driving a lens, and is therefore a factor essential to autofocusing.

However, when focusing to an object from a position distant from an in-focus position is carried out, focusing is not successful by driving the lens one time due to errors of a focus detection on the camera side or optical errors, etc., and an in-focus state may be attained by driving the lens two or three times. In such a case, what is most important to shorten the time until an in-focus state is attained is to drive the lens up to the in-focus position accurately by driving the lens one time.

For this reason, there are autofocusing cameras which carry out processing called an "overlap operation" by carrying out focus detection and calculation once or a plurality of times after driving of the lens is started based on the focus detection result while the lens is being driven at a fixed speed. This processing allows focus detection in a place close to the in-focus position, and can thereby improve the accuracy of the focus detection result and attain an in-focus state by driving the lens one time.

Carrying out this overlap operation requires the lens to be driven at an appropriate driving speed according to the focus detection performance of the camera and brightness of the object. Therefore, it is important to accelerate the lens to a certain speed as quickly as possible and then drive the lens at a stable driving speed.

However, accelerating the motor drastically causes the motor speed to exceed a target speed, that is, an "overshoot" which requires a considerable time until the speed is stabilized to the target speed.

More specifically, in the case of conventional motor acceleration control, as shown by a curve B in FIG. 11, the speed is controlled by decreasing or increasing the voltage to be applied to the motor after an overshoot exceeding the target speed occurs so that it is finally converged to the target speed. The method of controlling the voltage applied to the motor in this way causes the driving speed to change more slowly than the applied voltage changes and takes a long time until it is stabilized to the target speed.

SUMMARY OF THE INVENTION

It is an object of the present invention to provide a motor control apparatus and lens apparatus adapted so as to accelerate the motor speed to a target speed as quickly as possible, reduce an overshoot with respect to the target speed and stabilize the motor speed in a short time.

In order to attain the above-described object, one aspect of the motor control apparatus of the present invention includes a speed detection unit that outputs a signal according to the speed of the motor or a movable unit which is driven by the motor. Furthermore, the apparatus includes a control unit which causes, when carrying out control on acceleration of the motor or the movable unit to the target speed, an electric brake to act on the motor when the speed detected based on the signal from the speed detection unit exceeds the target speed.

As the movable unit, a lens unit provided in a manner movable in the direction of the optical axis can be taken as a specific example.

Furthermore, the present invention is effective in the case where a target amount of driving, etc., of the lens unit is calculated (overlap operation) for focusing when the speed detected based on the signal from the speed detection unit is kept at the target speed at the time of acceleration in a lens apparatus or camera.

The features and advantages of the motor control apparatus and lens apparatus of the present invention will become more apparent from the following detailed descriptions of preferred embodiments of the invention with reference to the drawings.

DETAILED DESCRIPTION OF THE PREFERRED EMBODIMENTS

With reference now to the attached drawings, embodiments of the present invention will be explained below.

Figure 1:
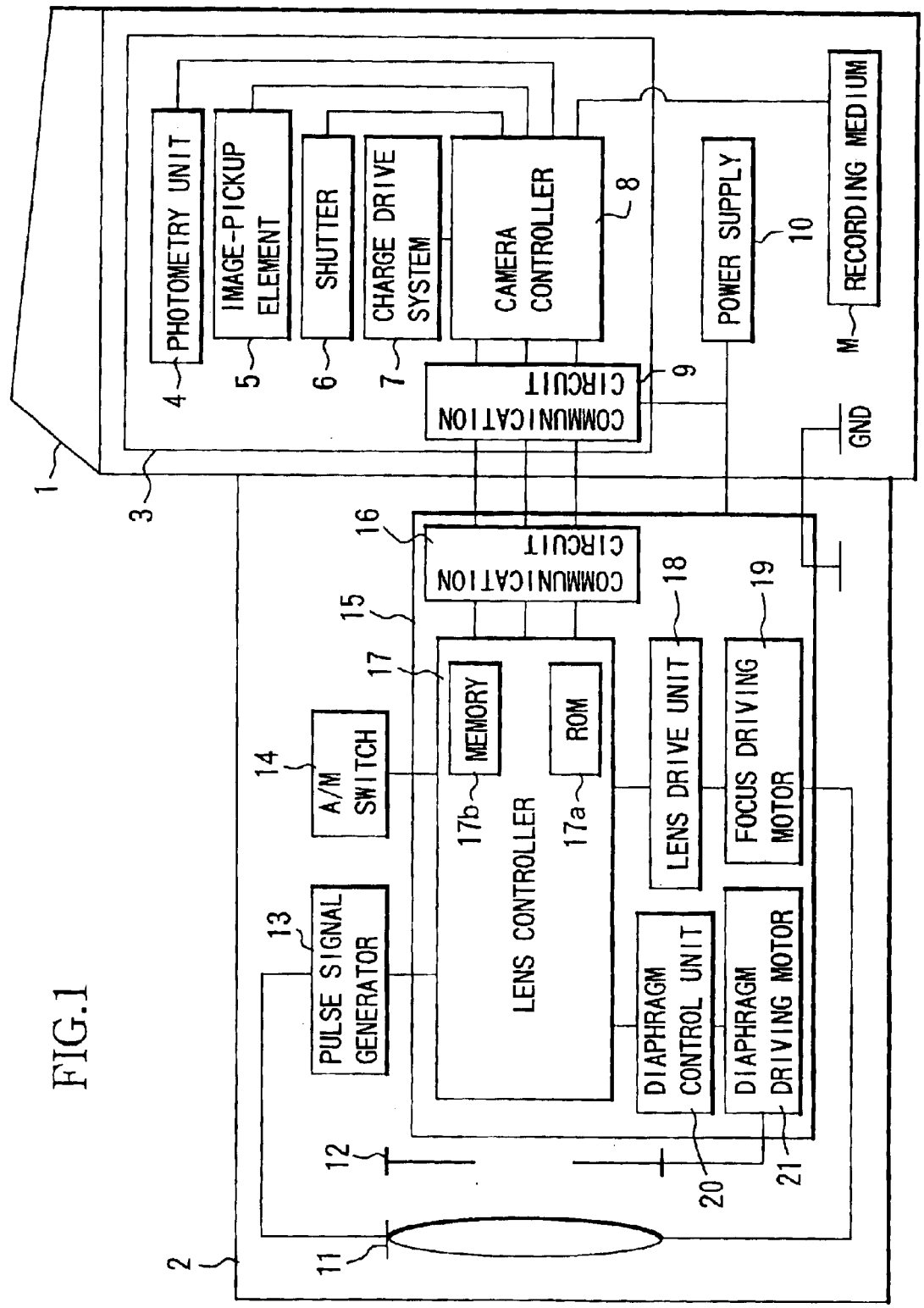
FIG. 1 is a block diagram of a camera system which is an embodiment of the present invention.

FIG. 1 illustrates a block diagram of a camera system which is an embodiment of the present invention. In FIG. 1, reference numeral 1 denotes a camera, 2 denotes an image-taking optical lens (lens apparatus) which is mounted on the camera 1 in a detachable or replaceable manner.

In the camera 1, reference numeral 3 denotes an electric circuit. This electric circuit 3 is provided with a photometry unit 4 which measures the amount of light that has passed through the image-taking optical system of the image-taking optical lens 2, an image-pickup element 5 which is a photoelectric conversion element that photoelectrically converts an object image formed of light from the image-taking optical lens 2, a shutter 6 which controls an exposure time of the image-pickup element 5, and a charge drive system 7 which charges the shutter 6. Additionally, the camera is provided with a camera controller 8 which performs various types of control in the camera 1 and is made up of a CPU or MPU, etc. The camera controller 8 also serves as a focus detecting unit which detects the focusing state of the image-taking optical system (hereinafter, referred to as "focus detection") based on signals obtained through photoelectric conversion in at least two image pickup areas in the image pickup device 5 with Phase Difference Detecting Method or the like. Furthermore, the camera is provided with a communication circuit 9 which performs serial communication with the image-taking optical lens 2. Furthermore, a power supply 10 is provided inside the camera 1 and electric power is also supplied to the image-taking optical lens 2 from this power supply 10.

An output signal from the image-pickup element 5 is subjected to various types of processing by an image processing circuit (not shown) built in the camera controller 8, converted to an image signal, displayed on an electronic view finder (not shown) or recorded in a recording medium M such as a semiconductor memory, magnetic disk and optical disk, etc.

In the image-taking optical lens 2, reference numeral 11 denotes a focusing lens and 12 denotes a diaphragm (stop). The image-taking optical lens 2 is provided with an image-taking optical system including these focusing lens 11, diaphragm 12 and zooming lens (not shown).

Reference numeral 14 denotes an A/M switch which switches between autofocus and manual focus, 15 denotes an electric circuit in the image-taking optical lens 2.

The electric circuit 15 is provided with a communication circuit 16 which carries out serial communication with the camera 1, a lens controller 17 made up of a CPU or MPU, etc., which controls the operations of the image-taking optical lens 2, a lens drive unit 18 which drives and controls a focus drive motor 19 which drives the focusing lens 11 according to a control signal from the lens controller 17 and a diaphragm drive unit 20 which drives and controls a diaphragm drive motor 21 which drives the diaphragm 12 according to a control signal from the lens controller 17.

Furthermore, a pulse generator 13 is provided inside the image-taking optical lens 2 as a speed detection unit which outputs a pulse signal as the focusing lens 11 moves. More specifically, the pulse generator 13 is constructed of a pulse plate made up of a disk which rotates as the focusing lens 11 moves with a plurality of slits formed thereon and a photo-interruptor which detects light that passes through the slits when the above-described pulse plate rotates and generates a pulse signal. As the speed detection unit, any device other than a photointerruptor such as photo-reflector or magnetic sensor can also be used.

Figure 2:
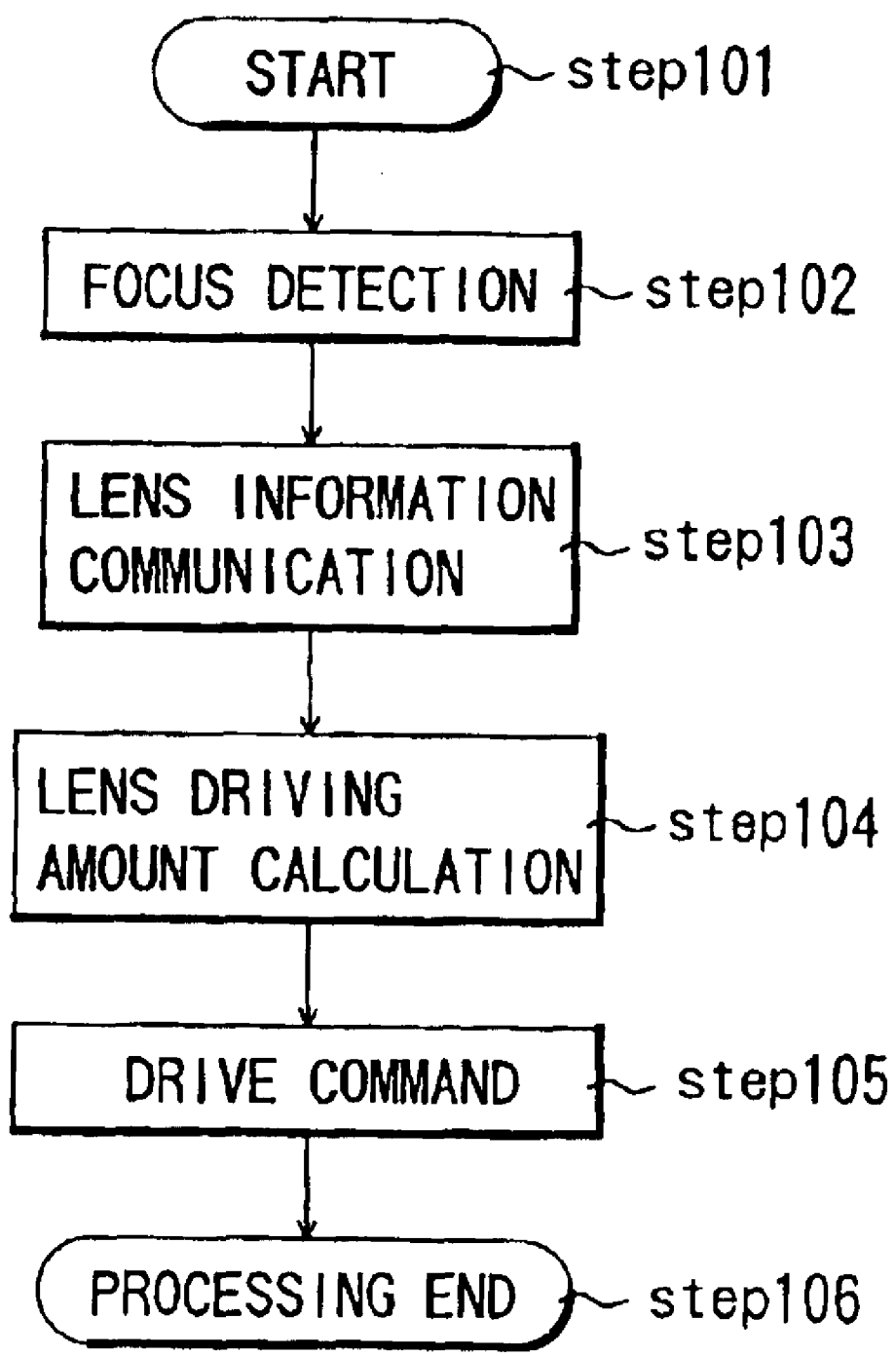
FIG. 2 is a flow chart showing autofocusing processing on the camera side of the camera system.

Then, the autofocusing processing operation on the camera 1 side (mainly camera controller 8) of the camera system of this embodiment will be explained using the flow chart in FIG. 2.

"step 101"

When an image-taking preparation switch (not shown) is turned on, the autofocusing processing operation of the camera controller 8 starts.

"step 102"

First, the camera controller 8 carries out focus detection as described above.

"step 103"

The camera controller 8 communicates with the image-taking optical lens 2 through the communication circuit 9 and acquires lens information showing various states of the image-taking optical lens 2.

"step 104"

The camera controller 8 calculates the driving amount of the focusing lens 2 up to the in-focus position based on the focus detection result obtained at step 102 and the lens information obtained at step 103.

"step 105"

The camera controller 8 sends the driving amount calculated at step 104 and a drive command for driving the focusing lens 11 to the image-taking optical lens 2. This drive command is converted to a drive pulse count of the focus drive motor 19 which drives the focusing lens 11 and sent.

"step 106"

The autofocusing processing operation on the camera side is finished.

Then, the autofocusing processing operation on the image-taking optical lens 2 (mainly lens controller 17) side will be explained using FIGS. 3 to 10. Circled numbers in FIGS. 3 to 10 indicate that they are mutually connected.

Figure 3:
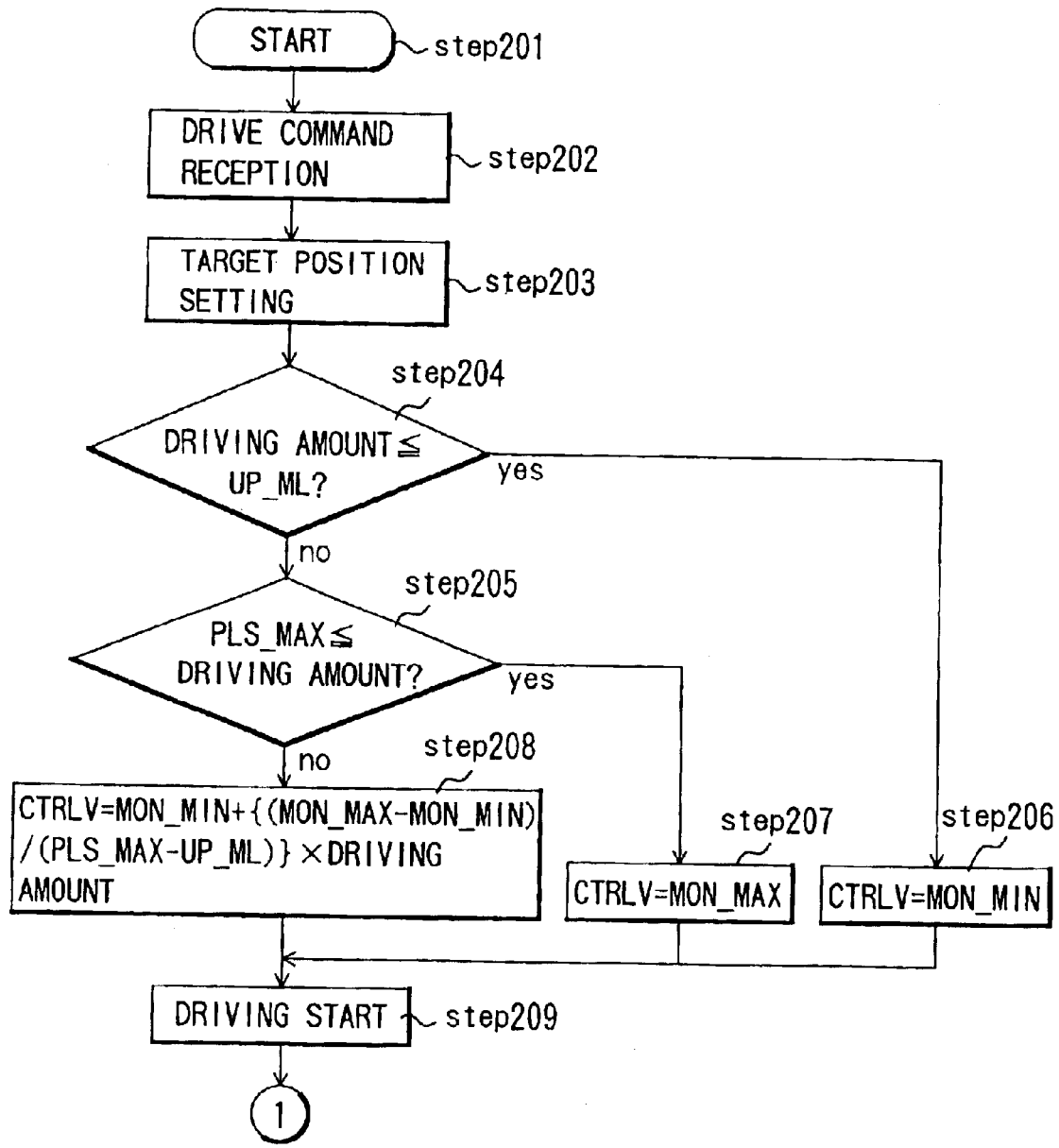
FIG. 3 is a flow chart showing processing when the lens is driven in autofocusing processing on the image-taking optical lens side of the camera system.

First, the processing on the image-taking optical lens 2 side at the startup when a drive command is received from the camera 1 at step 105 will be explained using the flow chart in FIG. 3.

"step 201"

When power is supplied from the camera 1, the processing of the lens controller 17 starts.

"step 202"

The lens controller 17 receives a drive command from the camera 1. This drive command is sent as a drive pulse count of the focus drive motor 19 obtained by the focus detection by the camera 1.

"step 203"

The lens controller 17 calculates and sets a target position based on the current value (current position) of the pulse count output from the pulse generator 13 and the drive pulse count sent from the camera 1 at step 202. At this time if the driving direction is opposite the previous driving direction, for example, processing such as adding the driving amount corresponding to the play of a driving force transmission mechanism (not shown) which transmits the driving force of the focus drive motor 19 to the focusing lens 11 is also carried out.

"step 204"

The lens controller 17 decides whether the driving amount (drive pulse count) of the focus drive motor 19 up to the target position is equal to or smaller than a predetermined during amount UP_ML (which will be explained in detail later) or not. When the driving amount is larger than UP_ML, the process progresses to step 205, and to step 206 otherwise.

"step 205"

The lens controller 17 decides whether the driving amount is equal to or larger than a predetermined driving amount PLS_MAX or not. When the driving amount is equal to or larger than PLS_MAX, the process progresses to step 207, and to step 208 otherwise.

"step 206"

When the driving amount is smaller than UP_ML, the lens controller 17 sets a predetermined minimum drive voltage MON_MIN as the drive voltage CTRLV of the focus drive motor 19. In the case of driving whose driving amount is equal to or smaller than UP_ML, the drive voltage becomes the minimum drive voltage MON_MIN, thus preventing an overrun with respect to the target position due to excessive drive voltage when the driving amount is small.

However, in the case of driving at the minimum drive voltage MON_MIN, if the driving amount is a large value requiring the motor 19 to be accelerated, acceleration is slowed down and the driving time is extended. Therefore, the smallest possible driving amount which will not require acceleration is set as UP_ML.

"step 207"

When the driving amount is equal to or larger than PLS_MAX, the lens controller 17 sets a predetermined maximum drive voltage MON_MAX as the drive voltage CTRLV of the focus drive motor 19.

The predetermined driving amount PLS_MAX is a minimum necessary pulse count to stop an overrun beyond the target position when the lens is decelerated from the driving state at the maximum drive voltage MON_MAX toward stopping. When the remaining driving amount falls below PLS_MAX, the lens is subjected to deceleration control.

When the driving amount is equal to or larger than PLS_MAX, it is possible to speed up acceleration of the motor up to the target speed by applying the maximum drive voltage MON_MAX to the focus drive motor 19.

"step 208"

When driving amount becomes UP_ML<driving amount<PLS_MAX, the lens controller 17 sets the drive voltage CTRLV as follows:

$$CTRLV = MON\_MIN + \left(\frac{MON\_MAX - MON\_MIN}{PLS\_MAX - UP\_ML}\right) \times \text{Driving amount}$$

Therefore, when the driving amount is between UP_ML and PLS_MAX, the drive voltage becomes a value obtained by linearly interpolating from MON_MIN to MON_MAX.

"step 209"

The lens controller 17 applies the drive voltage set in steps 206 to 208 and starts the focus drive motor 19. Then, it moves on to step 301 shown in FIG. 4.

The aforementioned UP_ML, PLS_MAX, MON_MIN and MON_MAX are prestored in a ROM 17a provided in the lens controller 17.

Figure 4:
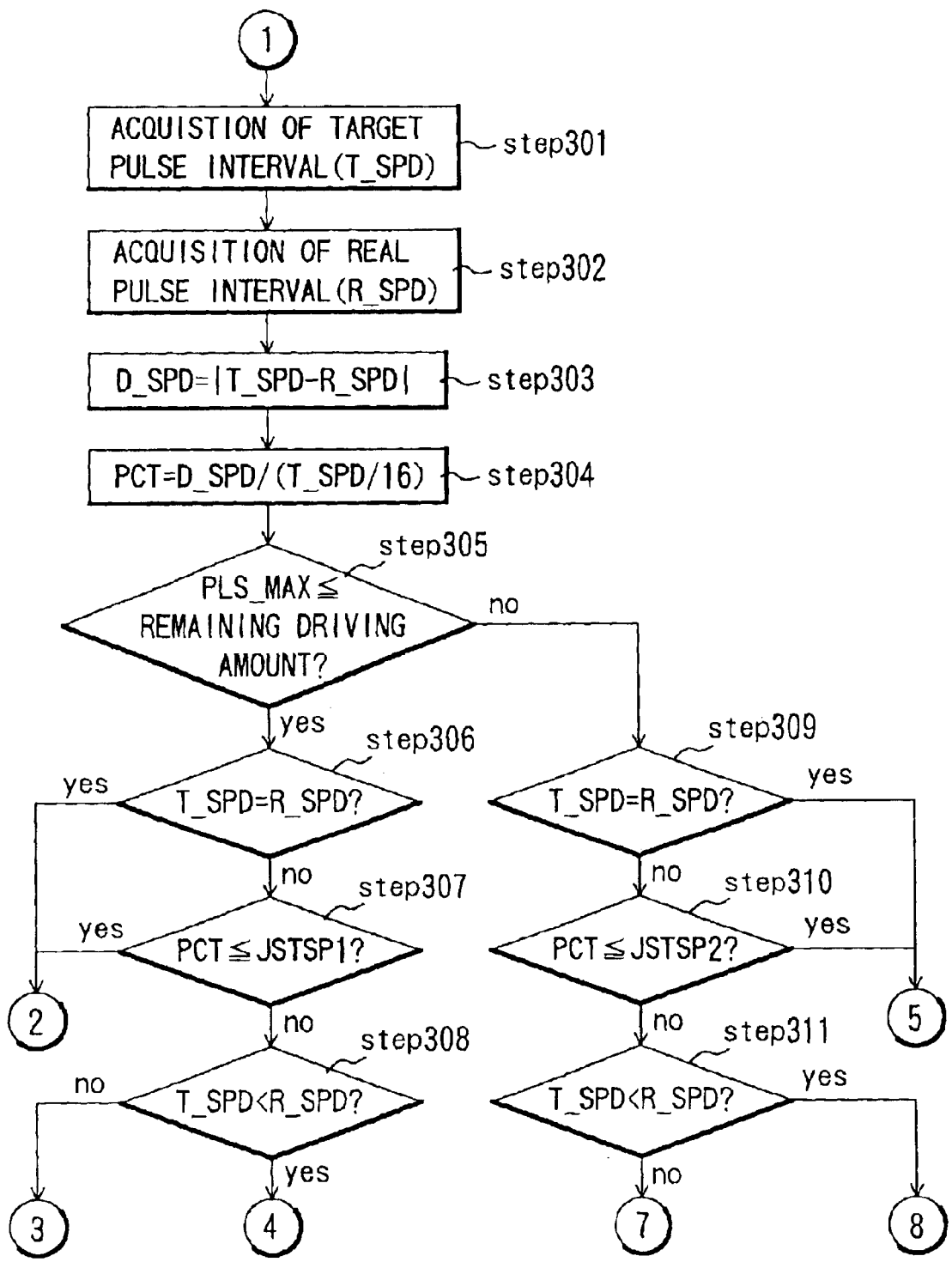
FIG. 4 is a flow chart showing speed decision processing during acceleration and during constant speed driving of the lens in the autofocusing processing on the image-taking optical lens side.

Then, the processing during acceleration and during driving at a constant speed of the focusing lens 11 (focus drive motor 19) will be explained using the flow chart in FIG. 4.

"step 301"

After the motor is started in step 209, the lens controller 17 acquires T_SPD which is a target pulse. interval interval corresponding to the target driving speed. This target pulse interval T_SPD indicates a target interval of the pulse signal output from the pulse signal generator 13 as the focusing lens 11 moves and varies depending on a speed specification command from the camera 1 and the focal length of the image-taking optical lens 2. The values of T_SPD are stored in the ROM 17a in the lens controller 17.

"step 302"

The lens controller 17 acquires an interval (real pulse interval) R_SPD of the pulse signal output from the pulse signal generator 13. The real pulse interval R_SPD is shorter than the target pulse interval T_SPD means that the speed at which the focusing lens 11 is actually driven (real driving speed) is higher than the target driving speed, and that the real pulse interval R_SPD is longer than the target pulse interval T_SPD means that the speed at which the focusing lens 11 is actually driven is lower than the target driving speed.

"step 303"

The lens controller 17 calculates D_SPD which is the absolute value of the difference between the target pulse interval T_SPD and real pulse interval R_SPD.

"step 304"

The lens controller 17 calculates PCT which is a ratio of the real pulse interval R_SPD to the target pulse interval T_SPD. PCT is calculated as follows:

$$PCT = \frac{R\_SPD}{(T\_SPD/16)}$$

When PCT is 1, the ratio of T_SPD to R_SPD is 6.25%.

"step 305"

The lens controller 17 decides whether the remaining driving amount is equal to or larger than PLS_MAX or not.

When the remaining driving amount is equal to or larger than PLS_MAX, the lens controller 17 decides that the lens is being accelerated or being driven at a constant speed and moves on to step 306 and when the remaining driving amount is smaller than PLS_MAX, the lens controller 17 decides that the lens is being decelerated, and the process progresses to step 309.

"step 306"

The lens controller 17 compares the target pulse interval T_SPD with the real pulse interval R_SPD. If these values are the same (that is, the real driving speed is equal to the target driving speed), the process progresses to step 401 in FIG. 5 and if they are different, the process progresses to step 307.

"step 307"

The lens controller 17 compares PCT which is the ratio of the real pulse interval obtained at step 304 to the target pulse interval with a predetermined value JSTSP1 (prestored in the ROM17a). Here, JSTSP1 indicates an allowable ratio of the real pulse interval R_SPD during acceleration processing and driving at a constant speed with respect to the target pulse interval T_SPD. If PCT is equal to or smaller than JSTSP1, then it is decided that the focusing lens 11 is driven within the range of the target driving speed (hereinafter simply referred to as "target driving speed").

Figure 5:
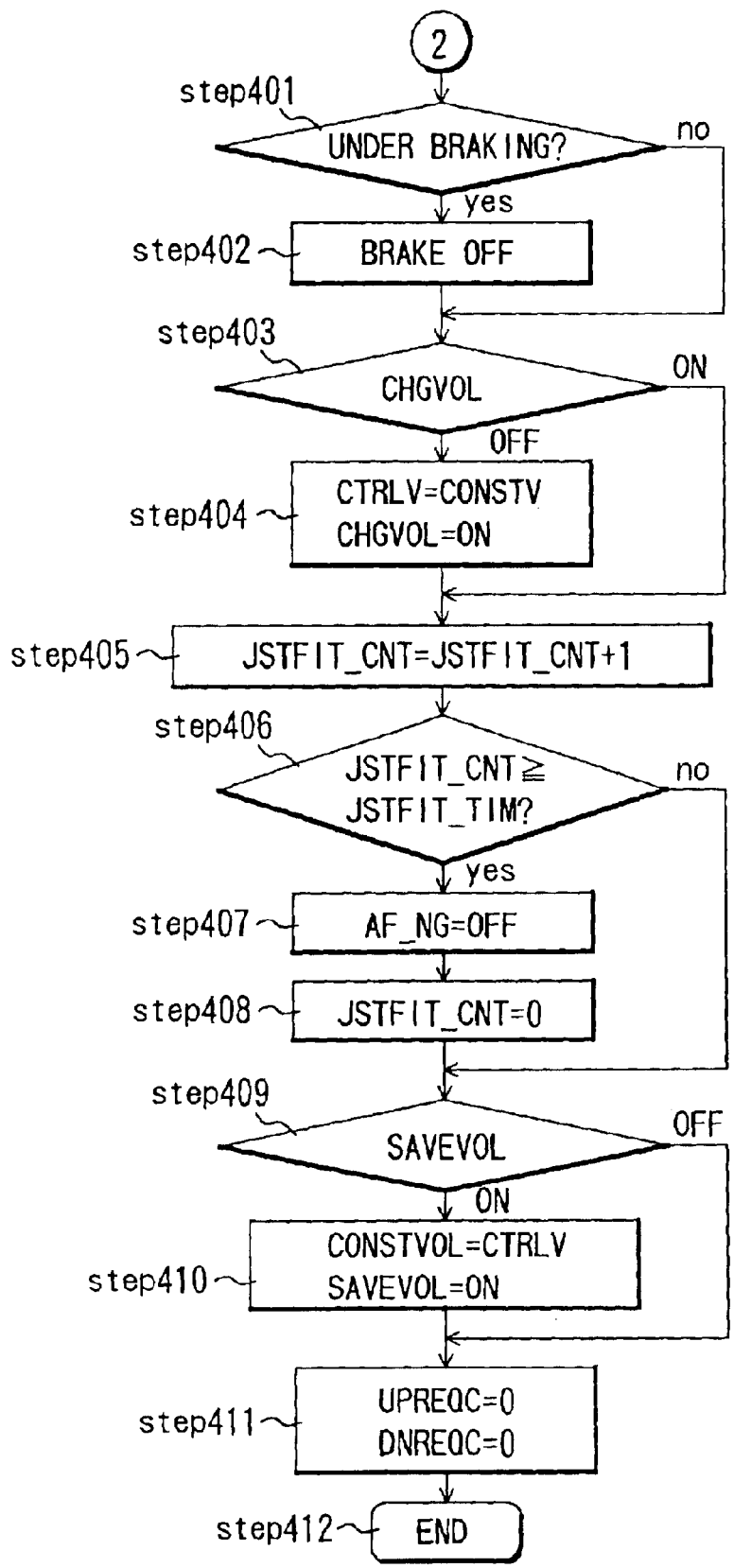
FIG. 5 is a flow chart showing processing for keeping the target speed during acceleration and during constant speed driving of the lens in the autofocusing processing on the image-taking optical lens side.

When PCT is equal to or lower than JSTSP1, the process progresses to step 401 shown in FIG. 5, and to step 308 otherwise.

"step 308"

The lens controller 17 compares the real pulse interval R_SPD with the target pulse interval T_SPD. When the real pulse interval R_SPD is shorter than the target pulse interval T_SPD, namely when the real driving speed is faster than target driving speed, the process progresses to step 501 shown in FIG. 6, and when the real pulse interval R_SPD is longer than the target pulse interval T_SPD, namely when the real driving speed is slower than target driving speed, the process progresses to step 601 shown in FIG. 7.

"step 309"

The lens controller 17 compares the target pulse interval T_SPD with the real pulse interval R_SPD. When these values are the same (that is, the real driving speed is equal to the target driving speed), the process progresses to step 701 shown in FIG. 8, and when they are different it progresses to step 310.

"step 310"

The lens controller 17 compares PCT which is the ratio of the real pulse interval R_SPD obtained at step 304 to the target pulse interval T_SPD with a predetermined value JSTSP2 (prestored in the ROM17a). Here, JSTSP2 indicates the allowable ratio of the real pulse interval R_SPD to the target pulse interval T_SPD during deceleration processing. If PCT is equal to or smaller than JSTSP2, the lens controller 17 decides that the focusing lens 11 is driven within the range of the target driving speed (hereinafter simply referred to as "target driving speed").

If PCT is smaller than JSTSP2, the process progresses to step 701 and step 311 otherwise.

"step 311"

The lens controller 17 compares the real pulse interval R_SPD with the target pulse interval T_SPD. When the real pulse interval R_SPD is shorter than the target pulse interval T_SPD, namely when the real driving speed is faster than the target driving speed, the process progresses to step 801 shown in FIG. 9. On the other hand, when the real pulse interval R_SPD is longer than the target pulse interval T_SPD, namely when the real driving speed is slower than the target driving speed, the process progresses to step 901 shown in FIG. 10.

Then, the processing when the lens controller 17 decides at step 305 and step 306 in FIG. 4 that the focusing lens 11 is being driven at the target driving speed will be explained using the flow chart in FIG. 5.

"step 401"

The lens controller 17 decides whether the electric brake (short brake or reversing brake: hereinafter simply referred to as a "brake") is being applied to the focus drive motor 19 or not. If the brake is being applied, the process progresses to step 402, and to step 403 otherwise.

"step 402"

Since the lens controller 17 has decided at step 401 that the brake is being applied, it proceeds to turn OFF the brake.

"step 403"

The lens controller 17 checks a CHGVOL flag (which will be described later) and if the flag is ON, the process progresses to step 405, and to step 404 otherwise.

"step 404"

The lens controller 17 sets CONSTV as the control voltage CTRLV.

The CONSTV is a drive voltage value of the focus drive motor 19 to drive the focusing lens 11 at a set target driving speed. Since the target driving speed varies depending on a speed specification command from the camera 1 and the focal length of the image-taking optical lens 2, the CONSTV is stored in the ROM 17a in the lens controller 17 for every speed specification command and every focal length.

Furthermore, the lens controller 17 sets the CHGVOL flag ON. Here, the CHGVOL flag is a flag to decide whether the CONSTV is set as the control voltage CTRLV or not. The CHGVOL flag is set to OFF before the setting of the CTRLV and set to ON after the setting of the CTRLV.

"step 405"

The lens controller 17 increments JSTFIT_CNT. This JSTFIT_CNT is a count value indicating the number of sampling times the lens controller 17 has decided consecutively that the focusing lens 11 is being driven at the target driving speed.

"step 406"

The lens controller 17 compares JSTFIT_CNT with JSTFIT_TIM. Here, JSTFIT_TIM is to decide that the driving of the focusing lens 11 is stabilized at the target driving speed. When the lens controller 17 decides the number of sampling times indicated by JSTFIT_TIM consecutively that the focusing lens 11 is driven at the target driving speed, it decides that the focusing lens 11 is being driven stably at the target driving speed.

When JSTFIT_CNT is JSTFIT_TIM or more, the process progresses to step 407, and to step 409 otherwise.

"step 407"

The lens controller 17 sets the AF_NG flag to OFF. The AF_NG flag is a flag indicating that the driving of the focusing lens 11 is being accelerated or decelerated. When this flag is ON, the camera 1 side cannot obtain a stable object image, and therefore no focus detection operation (overlap operation) is performed.

"step 408"

The lens controller 17 resets JSTFIT_CNT to 0.

"step 409"

The lens controller 17 checks a SAVEVOL flag. If the flag is ON, the process progresses to step 410 and if the flag is OFF the process progresses to step 411. Here, the SAVEVOL flag is a flag to decide whether the CONSTV value has been updated or not and it is set to OFF before an update and ON after an update.

"step 410"

The lens controller 17 assigns CTRLV to CONSTV. It also sets the SAVEVOL flag to ON. Since the lens controller 17 decides that the focusing lens 11 is being driven stably at the target driving speed, it assigns the control voltage CTRLV at this time to CONSTVOL which is a voltage set value during a constant speed operation. In this way, when the lens is driven at the same speed next time, it is possible to use this value as a drive voltage during driving at a constant speed and set a stable drive voltage even if there is a variation over time or environmental variation.

"step 411"

The lens controller 17 resets both UPREQC and DNREQC to 0.

UPREQC is a count value indicating the number of sampling times the real pulse interval R_SPD is consecutively decided to be longer than the target pulse interval T_SPD (the real driving speed is slower than the target driving speed). On the other hand, DNREQC is a count value indicating the number of sampling times the real pulse interval R_SPD is consecutively decided to be shorter than the target pulse interval T_SPD (the real driving speed is faster than the target driving speed).

"step 412"

The lens controller 17 finishes the processing corresponding to the decision that the real driving speed is the target driving speed.

Figure 6:
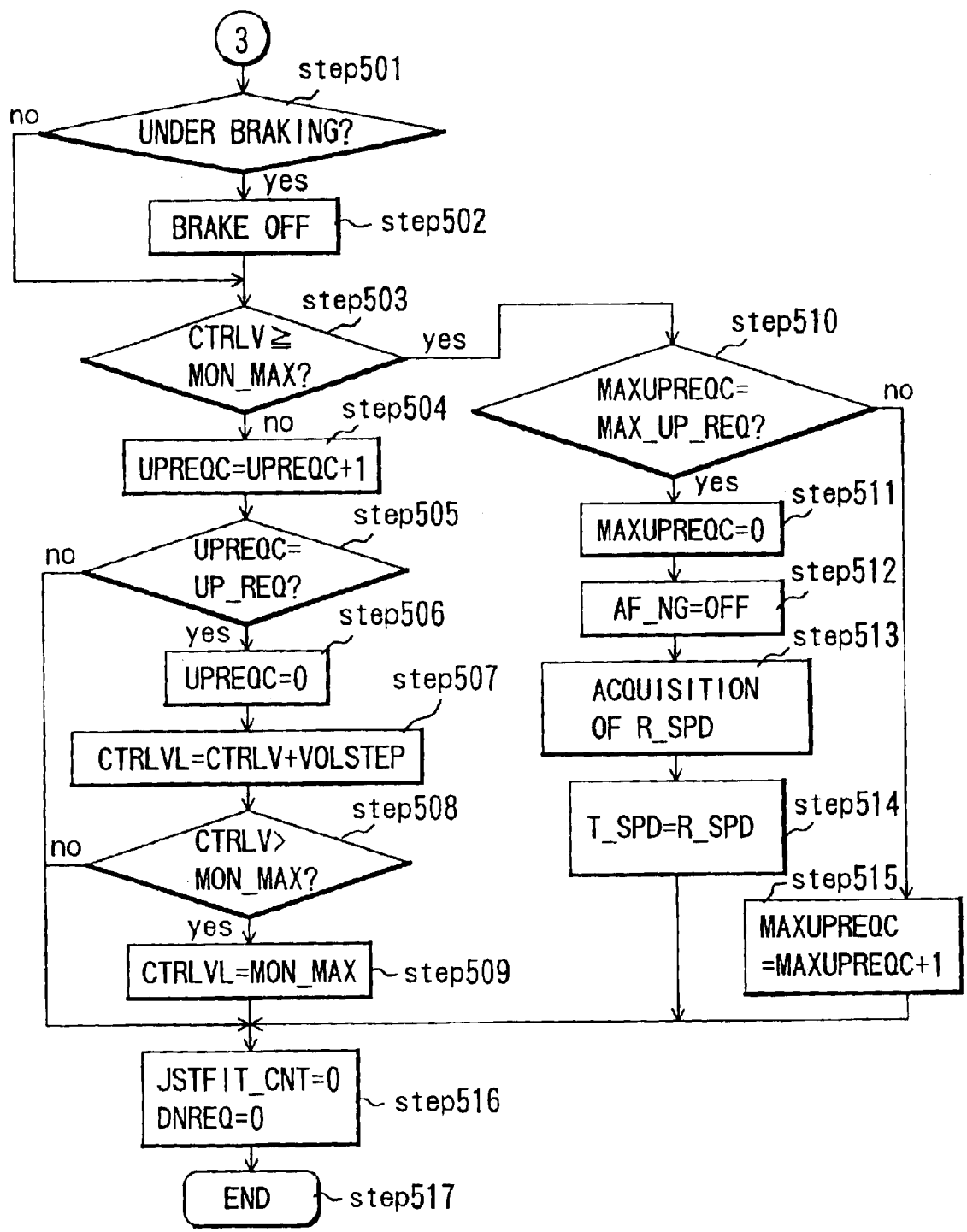
FIG. 6 is a flow chart showing acceleration processing during acceleration and during constant speed driving of the lens in the autofocusing processing on the image-taking optical lens side.

Then, the processing when the lens controller 17 decides at step 308 in FIG. 4 that the real pulse interval R_SPD is longer than the target pulse interval T_SPD, namely that the real driving speed is slower than the target driving speed will be explained using the flow chart in FIG. 6.

"step 501"

The lens controller 17 decides whether the brake is being applied or not. If the brake is being applied, the process progresses to step 502, and to step 503 otherwise.

"step 502"

The lens controller 17 turns the brake OFF.

"step 503"

The lens controller 17 compares the control voltage CTRLV with the maximum drive voltage MON_MAX. If CTRLV is equal to or higher than MON_MAX, the process progresses to step 510, and to step 504 otherwise.

"step 504"

The lens controller 17 increments UPREQC by 1.

"step 505"

The lens controller 17 compares UPREQC with UP_REQ. Here, UP_REQ is a value indicating the sensitivity when the drive voltage is increased to perform acceleration processing. The lens controller 17 performs the acceleration processing when it decides UP_REQ times consecutively that the real driving speed is slower than the target driving speed.

If UPREQC has the same value as UP_REQ, the process progresses to step 506, and to step 516 otherwise.

"step 506"

The lens controller 17 resets UPREQC to 0.

"step 507"

The lens controller 17 adds VOLSTEP to the control voltage CTRLV.

VOLSTEP is a voltage value added by acceleration processing one time and varies depending on the difference between the real driving speed (real pulse interval R_SPD) and target driving speed (target pulse interval T_SPD). Therefore, VOLSTEP is stored in the ROM 17a in the lens controller 17 in such a way that it has a large value when the difference is large and a small value when the difference is small.

"step 508"

The lens controller 17 compares the control voltage CTRLV with the maximum drive voltage MON_MAX. If CTRLV is higher than MON_MAX, the process progresses to step 509, and to step 516 otherwise.

"step 509"

Since the control voltage CTRLV is higher than the maximum drive voltage MON_MAX, the lens controller 17 sets CTRLV as MON_MAX. This allows CTRLV to be set within a range that it does not exceed MON_MAX.

"step 510"

The lens controller 17 compares MAXUPREQC with MAX_UP_REQ. Here, MAXUPREQC is a count value indicating the number of times the real driving speed is decided to be slower than the target driving speed during driving at the maximum drive voltage MON_MAX. On the other hand, MAX_UP_REQ indicates a wait time for deciding that the real driving speed does not reach the target driving speed even if the lens is driven at the maximum drive voltage MON_MAX. If the lens controller 17 decides MAX_UP_REQ times that the driving speed is slower than the target driving speed during driving at the maximum drive voltage MON_MAX, the lens controller 17 decides that it is not possible to reach the target driving speed.

If MAXUPREQC has the same value as MAX_UP_REQ, the process progresses to step 511, and to step 515 otherwise.

"step 511"

The lens controller 17 resets MAXUPREQC to 0.

"step 512"

The lens controller 17 sets an AF_NG flag to OFF. The AF_NG flag is a flag which is set to ON during acceleration/deceleration. If the lens controller 17 decides MAX_UP_REQ times during driving at the maximum drive voltage MON_MAX that the real driving speed is slower than the target speed, it decides that the acceleration has ended and the focusing lens 11 is currently being driven at a maximum constant speed and sets the AF_NG flag to OFF.

"step 513"

The lens controller 17 acquires the real pulse interval R_SPD which corresponds to the current speed (real driving speed).

"step 514"

The lens controller 17 sets the real pulse interval R_SPD acquired at step 513 as T_SPD which is the target pulse interval. This is the processing for stably driving the focusing lens 11 at the current speed when the lens controller 17 decides that the driving speed cannot reach the initial target driving speed even if the focusing lens 11 is driven at the maximum drive voltage MON_MAX.

"step 515"

The lens controller 17 increments MAXUPREQC by 1.

"step 516"

The lens controller 17 resets JSTFIT_CNT and DNREQC to 0.

"step 517"

The lens controller 17 finishes the acceleration processing corresponding to the decision that the driving speed is slower than the target driving speed during acceleration or during driving at a constant speed.

Figure 7:
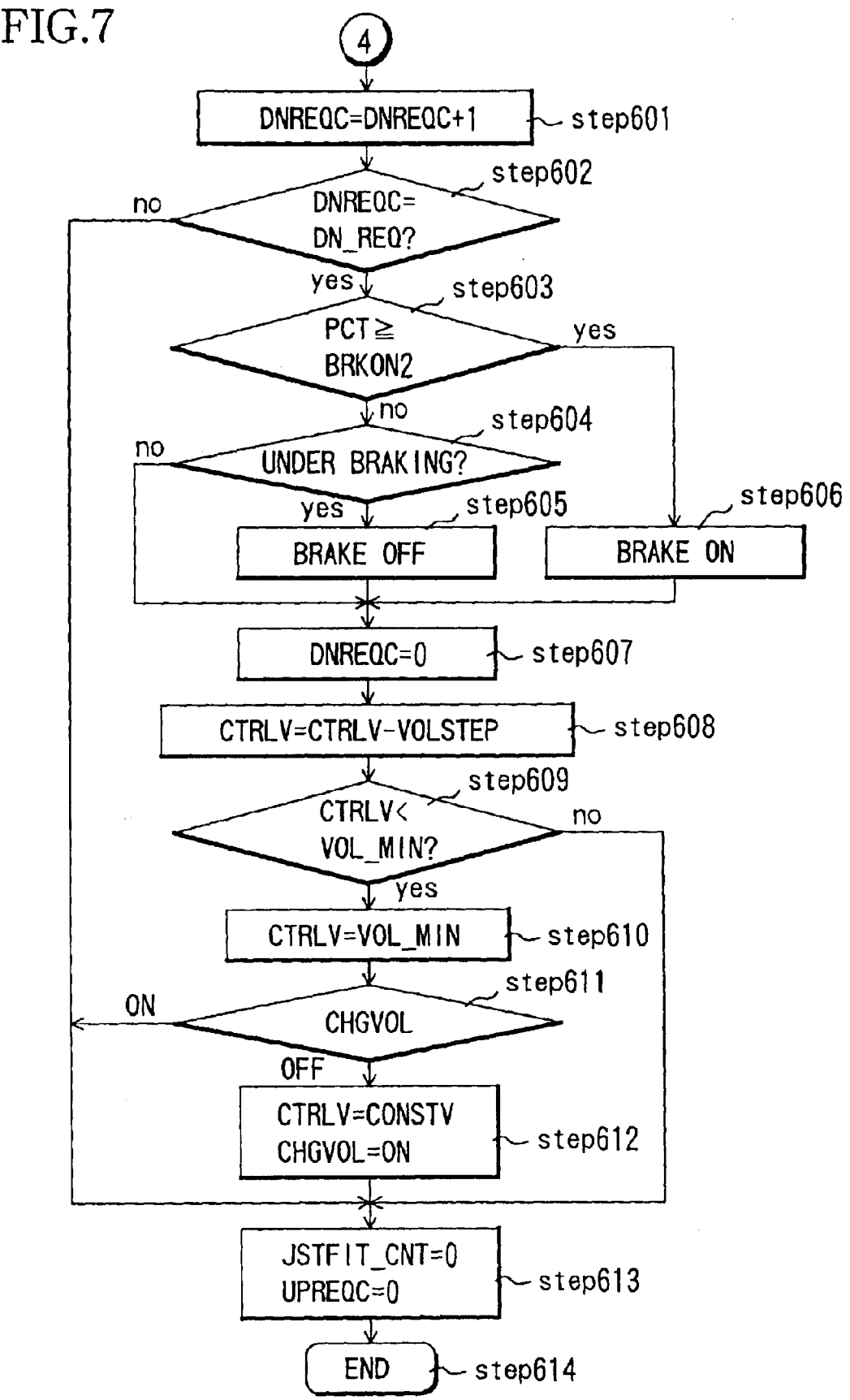
FIG. 7 is a flow chart showing deceleration processing during acceleration and during constant speed driving of the lens in the autofocusing processing on the image-taking optical lens side.

Then, the processing corresponding to the decision at step 307 in FIG. 4 that the real pulse interval R_SPD is shorter than the target pulse interval T_SPD, namely that the real driving speed is faster than the target driving speed will be explained using the flow chart in FIG. 7.

"step 601"

The lens controller 17 increments DNREQC by 1.

"step 602"

The lens controller 17 compares DNREQC with DN_REQ. Here, DN_REQ is the sensitivity for carrying out deceleration processing and carries out deceleration processing when the lens controller 17 decides DN_REQ times consecutively that the real driving speed is faster than the target driving speed.

If DNREQC has the same value as DN_REQ, the process progresses to step 603, and to step 613 otherwise.

"step 603"

The lens controller 17 compares PCT which is the rate of the real pulse interval R_SPD to the target pulse interval T_SPD with BRKON2. Here, BRKON2 indicates the ratio of the real pulse interval R_SPD to the target pulse interval T_SPD when the brake is applied during acceleration, that is, an amount by which the real speed exceeds the target speed (first predetermined speed). If PCT is equal to or larger than BRKON2, an electric brake (short brake or reversing brake) is applied to the focus drive motor 19.

When PCT is equal to or larger than BRKON2, the process progresses to step 606, and to step 604 otherwise.

"step 604"

The lens controller 17 decides whether the brake is being applied or not. If the brake is being applied, the process progresses to step 605 and step 607 otherwise.

"step 605"

Since the lens controller 17 has decided at step 604 that the brake is being applied, it turns OFF the brake.

"step 606"

Since PCT is equal to or larger than BRKON2 at step 603, the lens controller 17 turns ON the brake. That is, when the real driving speed exceeds the target driving speed by a predetermined speed (first predetermined speed) or more under acceleration control toward the target driving speed, the lens controller 17 performs brake processing.

Figure 11:
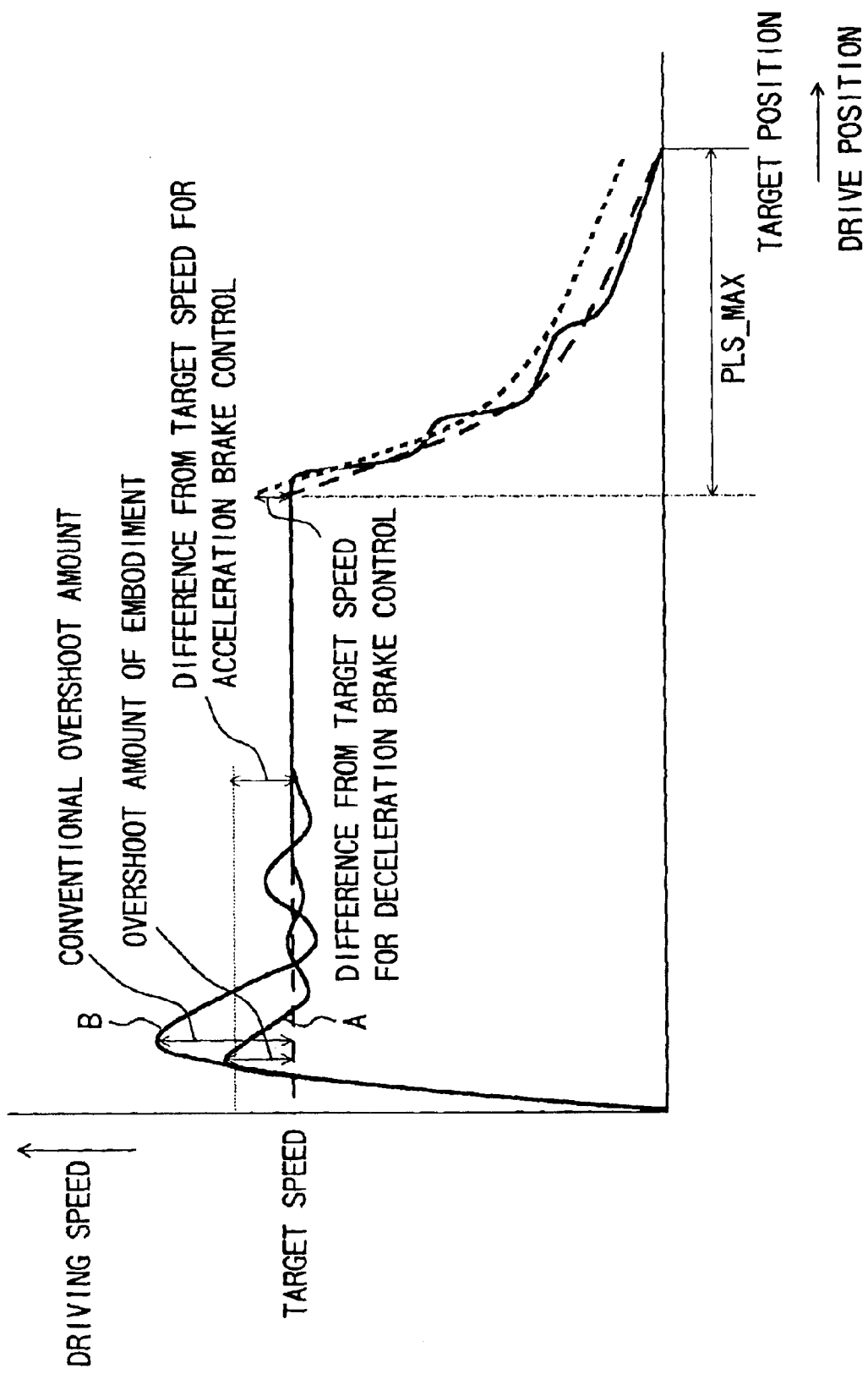
FIG. 11 illustrates a situation of lens deceleration control in the autofocusing processing on the image-taking optical lens side in contrast with a conventional example.

Compared to the method of suppressing an overshoot by controlling the motor drive voltage shown by the curve B in FIG. 11, this makes it possible to suppress the overshoot to a small level as shown by the curve A in FIG. 11. As a result, it is possible to converge (shorten the acceleration time) variations in the driving speed to the target driving speed more quickly than the voltage control.

In this way, by shortening the acceleration time and extending the driving time at a constant speed, it is possible to perform focus detection (overlap operation) by the camera 1 during the driving of focusing lens 11 reliably and accurately. Thus, it is possible to achieve focusing by lens driving one time based on the focus detection result.

"step 607"

The lens controller 17 resets DNREQC to 0.

"step 608"

The lens controller 17 subtracts VOLSTEP from the control voltage CTRLV. This causes the control voltage CTRLV to be set lower by VOLSTEP.

"step 609"

The lens controller 17 compares the control voltage CTRLV with the minimum drive voltage VOL_MIN. If CTRLV is smaller than VOL_MIN, the process progresses to step 610, and to step 613 otherwise.

"step 610"

The lens controller 17 sets the minimum drive voltage VOL_MIN as the control voltage CTRLV. This ensures that the control voltage CTRLV is controlled to a voltage equal to or higher than VOL_MIN.

"step 611"

The lens controller 17 checks the CHGVOL flag and if the CHGVOL flag in ON, the process progresses to step 613, and if OFF, the process progresses to step 612.

"step 612"

The lens controller 17 sets CONSTV as the control voltage CTRLV and sets the CHGVOL flag to ON. Even if the real driving speed exceeds the target driving speed during acceleration, this processing switches the voltage to a voltage for driving at a constant speed, and therefore it is possible to reduce subsequent variations and move on to stable driving at a constant speed more quickly.

"step 613"

The lens controller 17 resets JSTFIT_CNT and UPREQC to 0.

"step 614"

The lens controller 17 finishes the processing corresponding to the decision that the driving speed is faster than the target driving speed during acceleration and driving at a constant speed.

This is the processing during acceleration or constant speed driving at a target driving speed of the focusing lens 11 (focus drive motor 19).

Then, deceleration processing when the remaining driving amount up to the target position falls below PLS_MAX will be explained.

Figure 8:
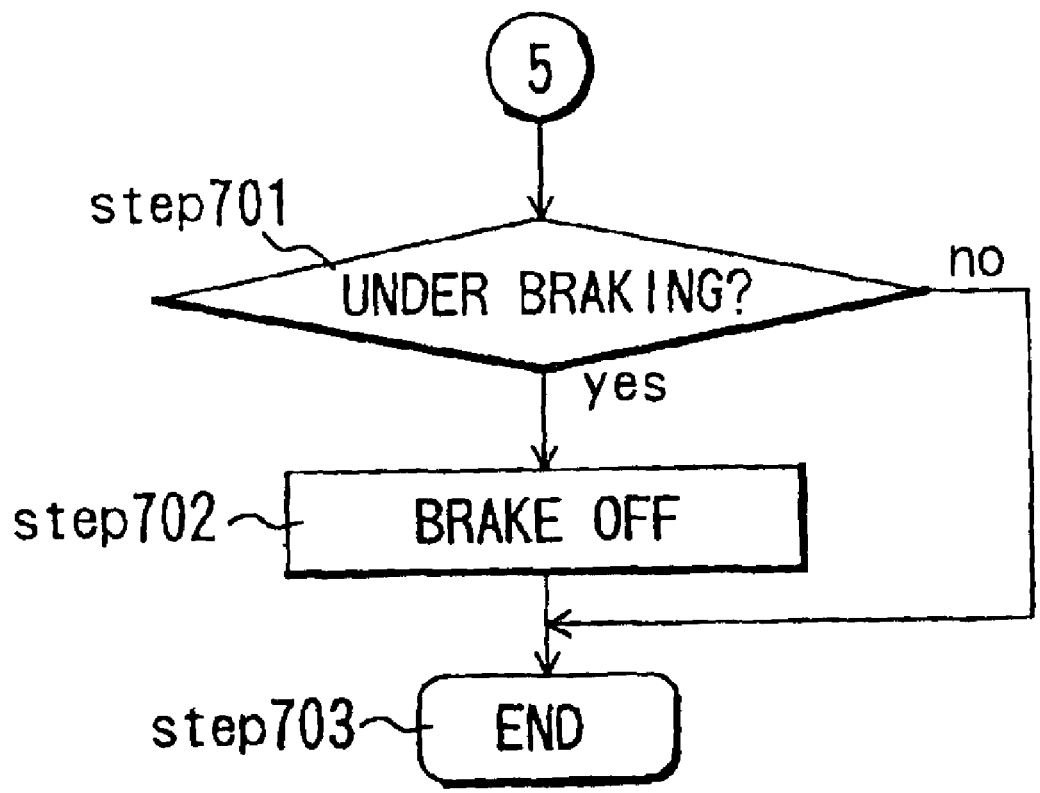
FIG. 8 is a flow chart showing processing for keeping the target speed during deceleration of the lens in the autofocusing processing on the image-taking optical lens side.

First, the deceleration processing when the real driving speed is driven at the target driving speed during deceleration shown by the coarse dotted line (curve) in FIG. 11 will be explained using the flow chart of FIG. 8. "Being driven at the target driving speed" here refers to a case where the aforementioned PCT is equal to or below JSTSP2 which is the aforementioned predetermined allowable ratio.

"step 701"

The lens controller 17 decides whether the brake is being applied or not. If the brake is being applied, the process progresses to step 702, and to step 703 otherwise.

"step 702"

Since the lens controller 17 decides in step 701 that the brake is being applied, it turns OFF the brake.

"step 703"

The lens controller 17 finishes the processing corresponding to the decision that the real driving speed is the target driving speed during deceleration.

Figure 9:
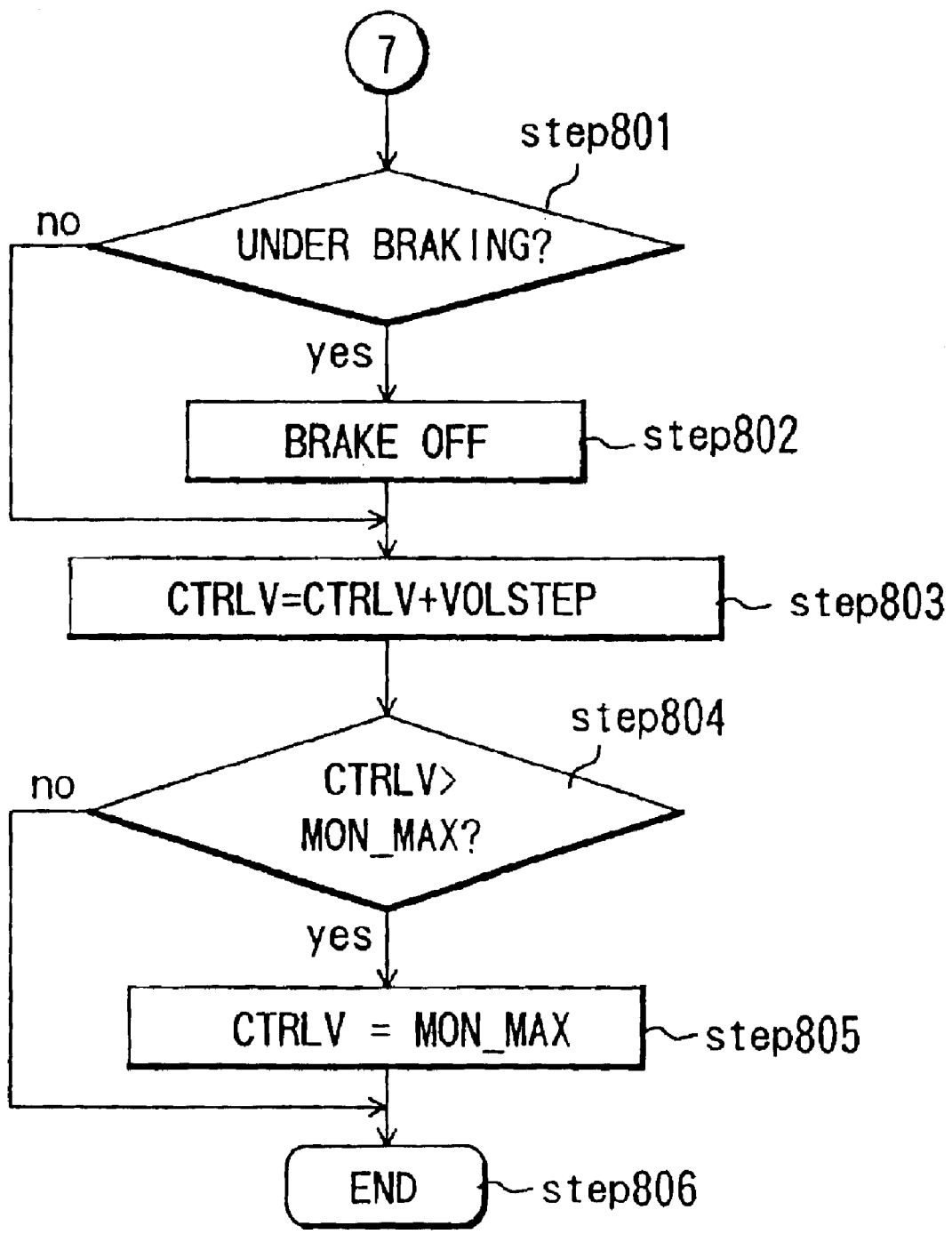
FIG. 9 is a flow chart showing acceleration processing during deceleration of the lens in the autofocusing processing on the image-taking optical lens side.

Then, the processing corresponding to the decision that the real driving speed is slower than the target driving speed during deceleration will be explained using the flow chart of FIG. 9.

"step 801"

The lens controller 17 decides whether the brake is being applied or not. If the brake is being applied, the process progresses to step 802, and to step 803 otherwise.

"step 802"

Since the lens controller 17 has decided at step 801 that the brake is being applied, it turns OFF the brake.

"step 803"

The lens controller 17 adds VOLSTEP to the control voltage CTRLV.

VOLSTEP is a voltage value added by acceleration processing one time and takes different values due to the difference between the real driving speed (real pulse interval R_SPD) and target driving speed (target pulse interval T_SPD). Namely, VOLSTEP has a large value when the difference is large and a small value when the difference is small. This VOLSTEP is stored in the ROM 17a in the lens controller 17.

"step 804"

The lens controller 17 compares the control voltage CTRLV with the maximum drive voltage MON_MAX. When CTRLV is higher than MON_MAX, the process progresses to step 805, and to step 806 otherwise.

"step 805"

Since the control voltage CTRLV is higher than the maximum drive voltage MON_MAX, the lens controller 17 sets the control voltage CTRLV as the maximum drive voltage MON_MAX. This causes the control voltage CTRLV to be set within a range not exceeding MON_MAX.

"step 806"

The lens controller 17 finishes the acceleration processing corresponding to the decision that the driving speed is slower than the target driving speed during deceleration.

Figure 10:
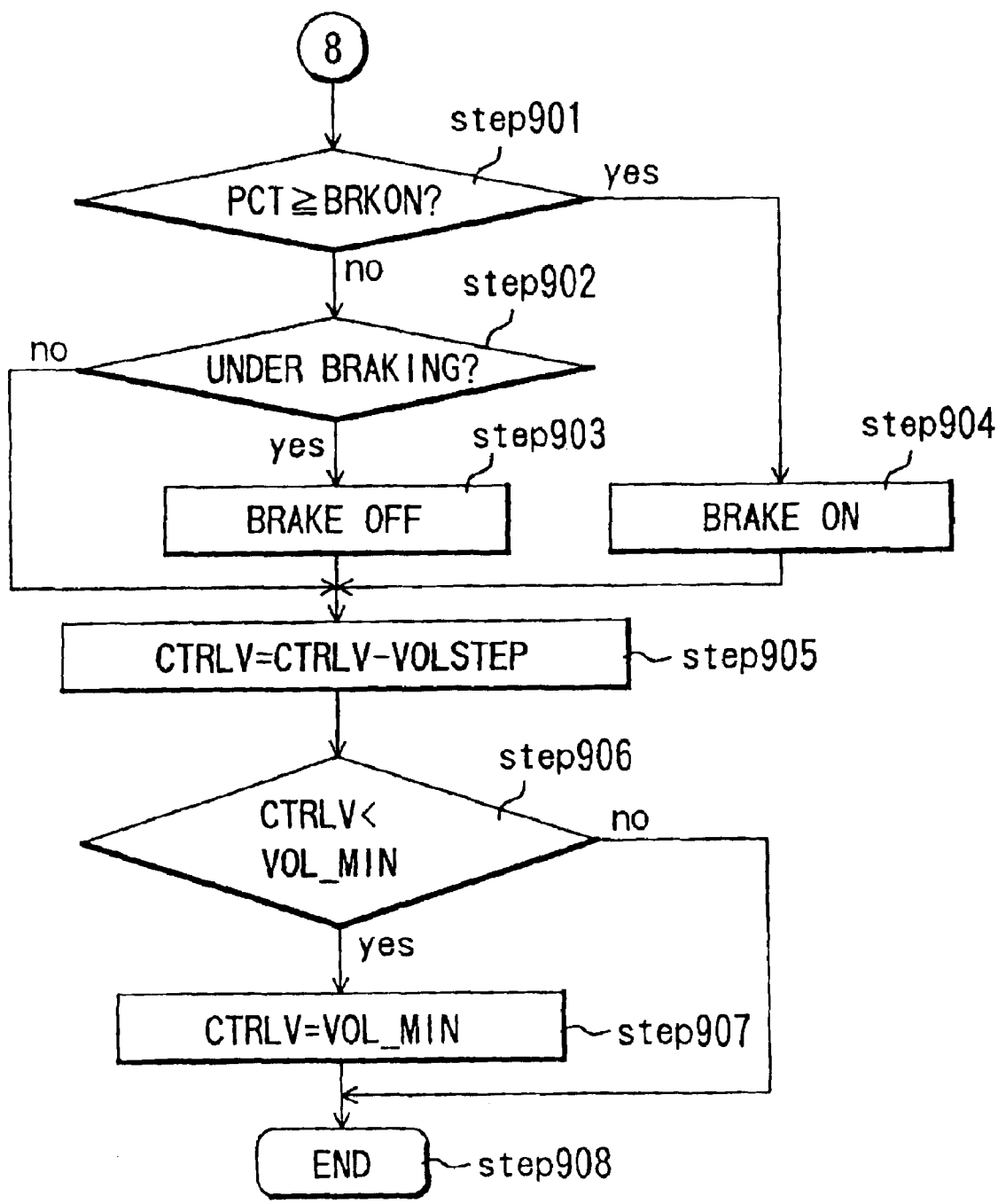
FIG. 10 is a flow chart showing deceleration processing during deceleration of the lens in the autofocusing processing on the image-taking optical lens side.

Then, the processing corresponding to the decision that the real pulse interval R_SPD is shorter than the target pulse interval T_SPD, namely that the real driving speed is faster than the target driving speed during deceleration at step 307 in FIG. 4 will be explained using the flow chart of FIG. 10.

"step 901"

The lens controller 17 compares PCT with BRKON. BRKON here refers to the ratio of the real pulse interval R_SPD to the target pulse interval T_SPD when the brake is being applied during deceleration, that is, it indicates the amount by which the real driving speed exceeds the target speed (second predetermined speed). If PCT is equal to or larger than BRKON, the brake is applied.

Here, BRKON and BRKON2 which is for applying the brake during acceleration can be set as different values. This allows optimum motor speed control to be carried out during acceleration control and stop (deceleration) control. These values can also be made variable (rewritable) as appropriate according to variations in the lens driving characteristic obtained with the image-taking optical lens 2 which is subject to individual differences and the characteristic of the focus drive motor 19. In this case, BRKON and BRKON2 are stored in a rewritable memory 17b such as EEPROM.

When PCT is equal to or larger than BRKON, the process progresses to step 904, and to step 902 otherwise.

"step 902"

The lens controller 17 decides whether the brake is being applied or not. If the brake is being applied, the process progresses to step 903, and step 905 otherwise.

"step 903"

Since the lens controller 17 has decided at step 902 that the brake is being applied, it turns the brake OFF.

"step 904"

Since PCT has been equal to or larger than BRKON at step 901, the lens controller 17 turns ON the brake. That is, during deceleration control to stop the focusing lens 11, if the real driving speed exceeds the target driving speed by a certain speed (second predetermined speed) or more, the lens controller 17 carries out brake processing. This allows the focusing lens 11 (focus drive motor 19) to be stopped in a shorter time than the case with voltage control.

"step 905"

The lens controller 17 subtracts VOLSTEP from the control voltage CTRLV. This causes the control voltage CTRLV to be set lower by VOLSTEP.

"step 906"

The lens controller 17 compares the control voltage CTRLV with the minimum drive voltage VOL_MIN. When CTRLV is lower than VOL_MIN, the process progresses to step 907, and to step 910 otherwise.

"step 907"

The lens controller 17 sets the minimum drive voltage VOL_MIN as the control voltage CTRLV. This makes sure that the control voltage CTRLV is controlled to a voltage equal to or higher than VOL_MIN.

"step 908"

The lens controller 17 finishes the processing corresponding to the decision that the driving speed is faster than the target driving speed during deceleration.

This is the processing for controlling deceleration to stop the focusing lens 11 (focus drive motor 19).

Thus, by controlling acceleration, constant speed operation and deceleration of the focusing lens 11, it is possible to shorten the time of driving the focusing lens 11 and secure a high degree of accuracy of the stop position.

The above-described embodiment has described the camera system of an exchangeable type image-taking optical lens and camera, but the present invention is also applicable to a camera integral with an image-taking optical lens. In this case, the camera controller in the above-described embodiment can also be adapted so as to carry out processing of the lens controller.

Furthermore, the above-described embodiment has described the digital camera system, but the present invention is also applicable to a film camera or film camera system.

Furthermore, the above-described embodiment has described the case where the motor for driving the focusing lens is driven and controlled, but the present invention is also applicable to driving and control of a motor that drives a movable unit other than the focusing lens. For example, the present invention is applicable to driving of a zoom lens provided with a power zooming mechanism.

As shown above, the motor control apparatus of the above-described embodiment reduces an overshoot with respect to the target speed by the action of the electric brake even if the motor (or movable unit such as a lens) is accelerated quickly to the target speed, and can thereby stabilize the motor speed to a target speed in a short time. Especially, applying the present invention to a motor which drives a focusing lens can shorten the time necessary for acceleration and extend the time during which the lens can be driven at a constant speed, and thereby carry out a calculation for focusing during constant speed driving of the focusing lens (overlap operation) reliably and accurately. Therefore, it is possible to achieve focusing by driving the focusing lens one time based on the focus detection result.

Setting an appropriate difference from the target speed for operating the electric brake during acceleration control and during deceleration control makes it possible to drive the movable unit or the lens more quickly and accurately.

While preferred embodiment has been described, it is to be understood that modification and variation of the present invention may be made without departing from the scope of the following claims.

What is claimed is:

1. A motor control apparatus which controls driving of a motor, comprising:

a speed detection unit which outputs a signal according to the speed of the motor or a movable unit driven by the motor; and a control unit which performs, during the acceleration control of the motor or the movable unit toward a target speed, control on the application of an electric brake to the motor when the speed detected based on the signal from the speed detection unit exceeds the target speed.

2. The motor control apparatus according to claim 1, wherein during the acceleration control, the control unit performs control on the application of the electric brake to the motor when the speed detected based on the signal from the speed detection unit exceeds the target speed by a predetermined speed or more and the motor control apparatus further comprises a storage circuit which stores the predetermined speed in a rewritable manner.

3. The motor control apparatus according to claim 1, wherein during the acceleration control, the control unit performs control on the application of the electric brake to the motor when the speed detected based on the signal from the speed detection unit exceeds the target speed by a first predetermined speed or more, and during the deceleration control toward stoppage, the control unit performs control on the application of the electric brake to the motor when the speed detected based on the speed detection unit exceeds a target speed for deceleration by a second predetermined speed or more, and the first predetermined speed is set to be different from the second predetermined speed.

4. The motor control apparatus according to claim 3, further comprising a storage circuit which stores the first and second predetermined speeds in a rewritable manner.

5. A lens apparatus comprising:

a lens unit movable in the direction of an optical axis;

a motor which drives the lens unit;

a speed detection unit which outputs a signal according to the motor or a lens unit driven by the motor;

a control unit which controls driving of the motor, wherein during the acceleration control of the motor or the lens to a target speed, the control unit performs control on the application of an electric brake to the motor when the speed detected based on the signal from the speed detection unit exceeds the target speed.

6. The lens apparatus according to claim 5, wherein during the acceleration control, the control unit performs control on the application of the electric brake to the motor when the speed detected based on the signal from the speed detection unit exceeds the target speed by a predetermined speed or more, and the lens apparatus further comprises a storage circuit which stores the predetermined speed in a rewritable manner.

7. The lens apparatus according to claim 5, wherein during the acceleration control, the control unit performs control on the application of the electric brake to the motor when the speed detected based on the signal from the speed detection unit exceeds the target speed by a first predetermined speed or more, and during the deceleration control toward stoppage, the control unit performs control on the application of the electric brake to the motor when the speed detected based on the signal from the speed detection unit exceeds a target speed for deceleration by a second predetermined speed or more, and the first predetermined speed is set to be different from the second predetermined speed.

8. The lens apparatus according to claim 7, further comprising a storage circuit which stores the first and second predetermined speeds in a rewritable manner.

9. A camera system comprising:

the lens apparatus according to claim 5; and a camera in which the lens apparatus can be mounted.

10. The camera system according to claim 9, wherein the camera comprises a calculating circuit which performs calculations for focusing when the speed detected based on the signal from the speed detection unit is kept at the target speed.

11. A camera comprising:

the lens apparatus according to claim 5; and a photoelectric conversion element which photoelectrically converts an object image formed by the lens apparatus.

12. The camera according to claim 11, further comprising a calculating circuit which performs calculations for focusing when the speed detected based on the signal from the speed detection unit is kept at the target speed.

* * * * *